US011886778B2

(12) United States Patent
Oetjens et al.

(10) Patent No.: US 11,886,778 B2
(45) Date of Patent: Jan. 30, 2024

(54) SHIFTING A FORMING LIMIT CURVE BASED ON ZERO FRICTION ANALYSIS

(71) Applicants: Thomas James Oetjens, Troy, MI (US); Thomas Lorne Chartrand, Clarkston, MI (US); Alexander Paul Oetjens, Troy, MI (US)

(72) Inventors: Thomas James Oetjens, Troy, MI (US); Thomas Lorne Chartrand, Clarkston, MI (US); Alexander Paul Oetjens, Troy, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 1092 days.

(21) Appl. No.: 16/687,294

(22) Filed: Nov. 18, 2019

(65) Prior Publication Data
US 2020/0082044 A1  Mar. 12, 2020

Related U.S. Application Data

(63) Continuation-in-part of application No. 15/317,585, filed as application No. PCT/US2015/034845 on Jun. 9, 2015, now abandoned.

(60) Provisional application No. 62/010,749, filed on Jun. 11, 2014.

(51) Int. Cl.
*G06F 30/20* (2020.01)
*G06F 17/15* (2006.01)
*B21D 22/20* (2006.01)
*G01N 3/28* (2006.01)
(Continued)

(52) U.S. Cl.
CPC ............. *G06F 30/20* (2020.01); *B21D 22/20* (2013.01); *G01N 3/28* (2013.01); *G06F 17/15* (2013.01); *G06F 30/333* (2020.01); *G06F 2113/24* (2020.01)

(58) Field of Classification Search
CPC ........ G06F 30/20; G06F 17/15; G06F 30/333; G06F 2113/24; G06F 2113/22; G06F 2119/18; B21D 22/20; G01N 3/28; Y02P 90/02
See application file for complete search history.

(56) References Cited

U.S. PATENT DOCUMENTS 5,572,896 A    11/1996  Story
2009/0056468 A1*  3/2009  Kubli ...................... G06F 30/20
                                                          73/826

(Continued)

OTHER PUBLICATIONS

Panich et al. "Determination of Forming Limit Stress Diagram for Formability Prediction of SPCE 270 Steel Sheet." Journal of Metals, Materials and Minerals. 2011. pp. 19-27 (retrieved from http://www.material.chula.ac.th/Journal/v21-1/19-27%20PANICH.pdf, entire document).

(Continued)

*Primary Examiner* — Zhipeng Wang
(74) *Attorney, Agent, or Firm* — Dickinson Wright PLLC

(57) ABSTRACT

A method for improving a hemispherical dome test includes calculating a forming limit diagram (FLD) based on a plurality of simulated data associated with a sheet metal transformation technique. The method also includes performing zero friction analysis on the sheet metal transformation technique. The method also includes shifting the FLD based on the zero friction analysis.

20 Claims, 10 Drawing Sheets

(51) Int. Cl.
*G06F 30/333* (2020.01)
*G06F 113/24* (2020.01)

(56) References Cited

U.S. PATENT DOCUMENTS

| | | | | |
|---|---|---|---|---|
| 2009/0177417 A1* | 7/2009 | Yonemura | ............... | G06F 30/15 |
| | | | | 702/42 |
| 2011/0295570 A1* | 12/2011 | Zhu | ..................... | G06F 30/23 |
| | | | | 703/2 |
| 2014/0019099 A1* | 1/2014 | Zhu | ..................... | G06F 30/23 |
| | | | | 703/2 |
| 2019/0220558 A1* | 7/2019 | Shen | ..................... | G06F 30/23 |

OTHER PUBLICATIONS

Safari et al. "Experimental and Numerical Analysis of Forming Limit Diagram (FLD) and Forming Limit Stress Diagram (FLSD)" Materials Sciences and Applications. May 11, 2011 (retrived from http:www.scirp.org/journal/PaperDownlaod.aspx?paperID=5038).
Lumelskyy et al. "Effect of Friction on Failure Location In Sheet Metal Formability Test" Computer Methods In Materials Science. 2013 (retrieved from http://www.cmms.agh.edu.pl/repo_filephp?f_id=409.

* cited by examiner

DIFFERENT BLANK SIZES FOR MINOR STRAIN
TO MAJOR STRAIN RATIOS

BINDER AND PUNCH  DIE

BLANK  DRAWN SHEET

SHIFTING A FORMING LIMIT CURVE BASED ON ZERO FRICTION ANALYSIS

CROSS REFERENCE TO RELATED APPLICATION

This Continuation In Part Patent Application claims the benefit of U.S. National Stage patent application Ser. No. 15/317,585, filed Dec. 9, 2016 entitled "Shifting A Forming Limit Curve Based On Zero Friction Analysis" which claims the benefit of PCT International Patent Application Serial No. PCT/US2015/034845 filed Jun. 9, 2015, entitled "Shifting A Forming Limit Curve Based On Zero Friction Analysis" which claims the benefit of U.S. Provisional Patent Application Ser. No. 62/010,749 filed Jun. 11, 2014, entitled "Shifting A Forming Limit Curve Based On Zero Friction Analysis" the entire disclosures of the applications being considered part of the disclosure of this application and hereby incorporated by reference.

BACKGROUND

Sheet metal is provided as a template to create a finished product. After various metal transformation techniques are performed on the sheet metal, the sheet metal may be converted to the finished product. The sheet metal manipulation may encompass different techniques, such as thinning, bending, cutting, and the like. The manipulated sheet metal may be sourced for various products, such as a body of a vehicle.

Producers of the various products that employ sheet metal often use computer aided design (CAD) programs to aid in the design and simulation of the products. A designer may enter parameters associated with the end product in the CAD program. Accordingly, the CAD program may run various simulations based on the intended design. The simulations may be employed to test performance, compatibility, and failure associated with different modifications.

One of the factors employed to determine failure is a forming limit curve (FLC). The FLC is employed with a hemispherical dome test. Essentially, a square or circular mark is placed on sheet metal, and after the deformation is made, the mark is analyzed relative to the FLC to obtain information about the process in which the sheet metal is transformed. The marks are on the side of the sheet away from the punch. A punch in regards to sheet metal transformation is an object that is in a fixed position. The die and the binders are moveable, but the punch stays fixed. Thus, when sheet metal is applied to the punch, the sheet metal conforms and bends based on force applied via the punch.

Each sheet metal has an upper and lower fiber. The upper fiber is away from the area contacting the punch, while the lower fiber is the area that contacts the punch. Accordingly, the various interpolations and formulas associated with judging the deformed mark relative to the FLC may allow the observer of the sheet metal formation to determine whether the deformation will ultimately lead to various failures. The physics definition of the FLC requires the FLC to be independent of friction, zero friction.

However, when performing the hemispherical dome test, friction contact stress causes various tensions and strains to be dispersed on the punch face. This leads to friction dependent distribution, with the maximums located along a portion of the circular region associated with the hemispherical dome punch.

FIG. 1 illustrates an example of employing a hemispherical punch 150 applied to a blank sheet metal 100. The hemispherical punch 150 includes an axis 160 (or pole), and angle 170 in which a failure will be detected due to friction. The sheet metal 100 includes a pole deformation 110 and a failure point 120.

Once the comparison is performed for the part shown in FIG. 1, a failure point 120 may be detected. However, after further analysis is performed, the failure point 120 may have strains influenced by the friction introduced by the performance of the hemispherical punch 150 as applied to sheet metal 100. In this case, the hemispherical dome test may become ineffective in performing and detecting failures associated with a part.

DESCRIPTION OF THE DRAWINGS

The detailed description refers to the following drawings, in which like numerals refer to like items, and in which.

SUMMARY

Figure 1:
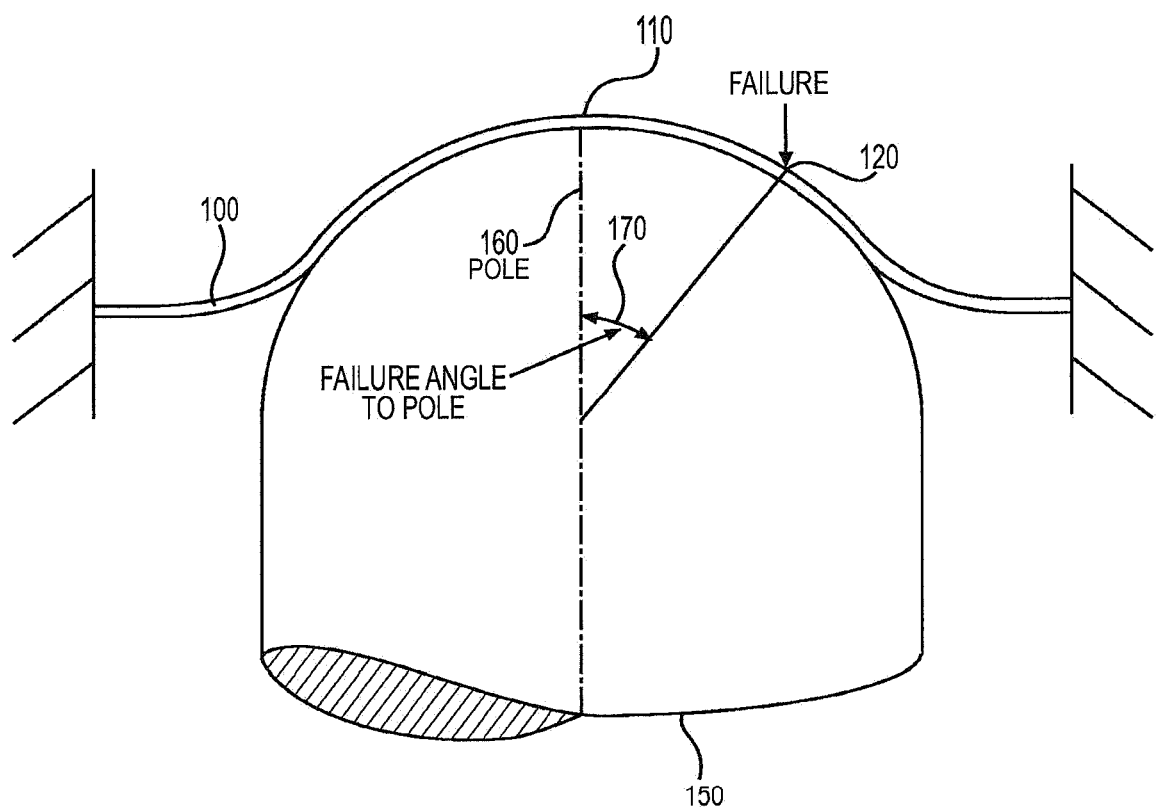
FIG. 1 illustrates an example of employing a hemispherical punch 150 applied to a blank sheet metal 100.

The following description relates to system and methods for shifting a forming limit curve based on zero friction analysis. Exemplary embodiments may also be directed to any of the system, the method, an application various computing devices described herein.

Additional features of the invention will be set forth in the description which follows, and in part will be apparent from the description, or may be learned by practice of the invention.

A method for shifting a forming analysis based on zero friction analysis is disclosed herein. The method includes calculating an alpha stress value from a ratio of a minor stress and a major stress from a predefined property of a hemispheric dome test of a die, the die being employed to deform sheet metal; generating an alpha stress value of a zero friction analysis for an upper fiber; generating a beta value of a zero friction analysis of a middle fiber; and combining the alpha stress value and the beta value to produce a corrected zero friction test; and calculating an updated forming limit diagram (FLD) based on the major stress, the minor stress, and the corrected zero friction test. During a design phase, the results of the updated FLD may be used to design the sheet metal formation, placement of the die or punch, or other suitable adjustments such that the resulting application of the die and or punch during formation accounts for the updated FLD.

It is to be understood that both the foregoing general description and the following detailed description are exemplary and explanatory and are intended to provide further explanation of the invention as claimed. Other features and aspects will be apparent from the following detailed description, the drawings, and the claims.

DETAILED DESCRIPTION

As noted above, conventional hemispheric dome tests employed to perform diagnosis on whether a deformed or transformed sheet metal leads to failures may be frustrated due to the introduction of friction. Thus, the tests may not be adequate in accurately predicting failure.

The hemispheric punch test with friction may lead to a failure detected with an angle to a pole. The failure occurs at a specified minor and major stress ratio. The Von Mises stress at the failure point 120 is determined theoretically by the strain path and material properties, with the Von Mises stress being independent of friction. Thus, because the Von Mises stress is independent of friction, and the test introduces friction, various assumptions of failure (e.g., resulting from the Von Mises stress) may not be wholly accurate.

A zero friction test is independent of friction. The zero friction test employs various heuristics, functions and other techniques to test a transformed sheet metal part to determine characteristics associated with the transformation. The zero friction test may detect a failure at a pole.

In the theoretical case with zero friction, a maximum amount of strain introduced during the forming process is experienced at the pole (e.g., the total maximum strain is concentrated at the pole). The blank sheet metal is adjusted so the maximum strain is in a plane strain. The depth is calibrated for the zero friction case using Von Mises middle fiber stress (e.g., membrane stress) because the FLC in the forming analysis uses the membrane stress fiber.

A punch depth is determined where the membrane stress value of the zero friction test equals the friction test upper fiber failure Von Mises stress and with the same beta value (e.g., the minor strain (MNSN) to major strain (MJSN) ratio). The zero friction case fails, according to stress failure theory, when the membrane stress value of the zero friction test equals the friction test upper fiber failure Von Mises stress level.

Disclosed herein are systems and methods for augmenting a hemispherical punch test with zero friction analysis. Thus, according to the aspects disclosed herein, a failure may be more accurately detected. By employing both the properties of a hemispherical punch test and the zero friction analysis, the false-positives incumbent in both tests may be avoided at a higher rate than employing each test individually.

Thus, according to the aspects disclosed herein, the lowest point of a hemispherical punch test based FLC curve can also be used to approximate a point-by-point translation of the entire FLC curve. A rigid body translation is made to the zero friction FLC, to create an approximate hybrid FLC which may be suitable for various sheet metal applications.

Figure 2:
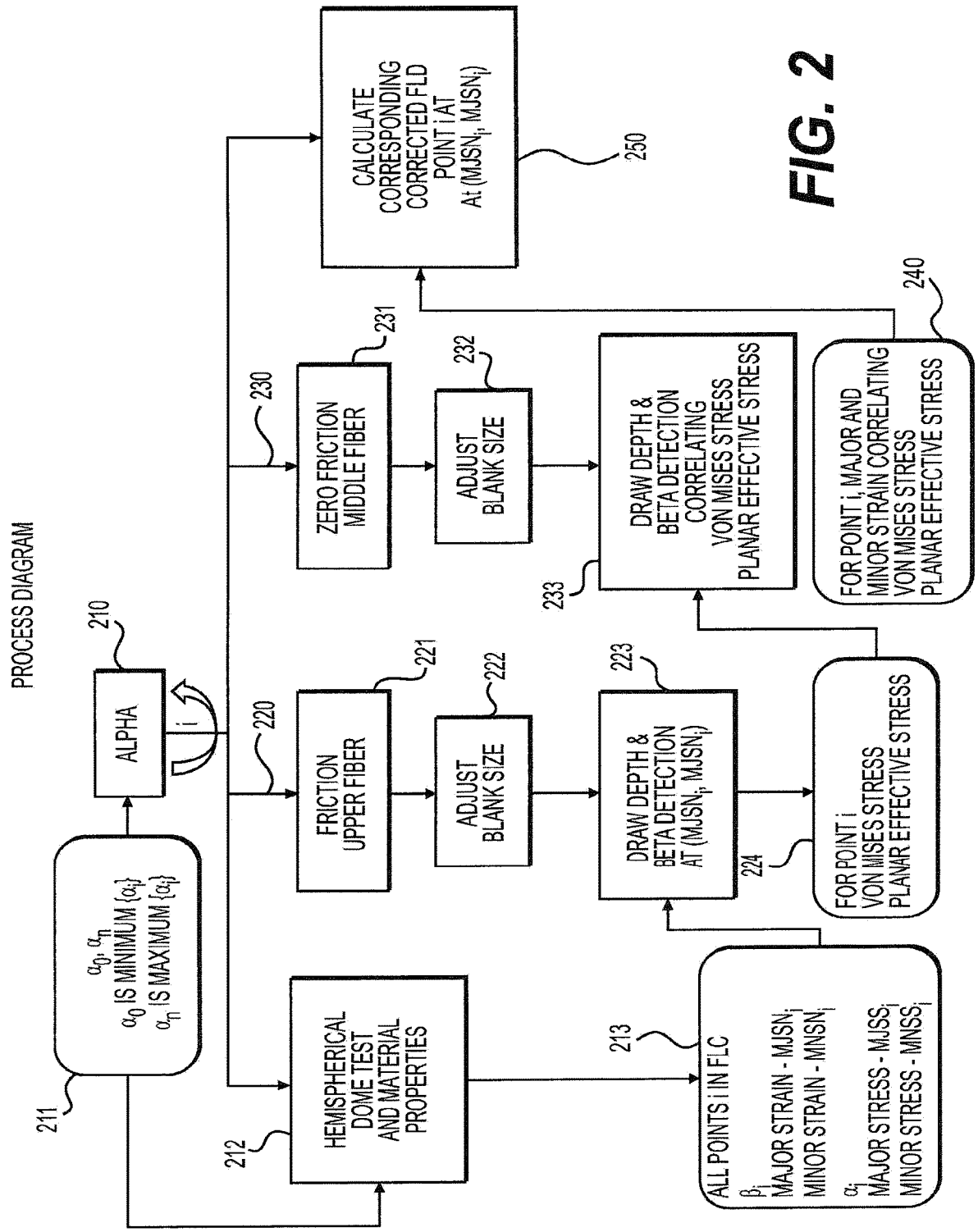
FIG. 2 illustrates an example implementation of a system and method for shifting a forming limit curve (FLC) based on a zero friction analysis.

FIG. 2 illustrates an example implementation of a system and method 200 for shifting the entire forming limit curve (FLC) point by point based on a zero friction analysis. The shift of a failure strain ratio of the friction hemispherical dome test FLC point to the corresponding zero friction point is the basis of the transformation. The method 200 may be performed via a processor, or stored on a non-volatile computer readable medium. The processor may include any suitable processor, such as those described herein. The processor may communicate with a memory. The memory may include instructions that, when executed by the processor, cause the processor to perform the techniques described herein. The memory may comprise a single disk or a plurality of disks (e.g., hard drives), and includes a storage management module that manages one or more partitions within the memory. In some embodiments, memory may include flash memory, semiconductor (solid state) memory or the like. The memory may include Random Access Memory (RAM), a Read-Only Memory (ROM), or a combination thereof.

In operation 210, alpha stress value, which is a ratio of the minor stress (MNSS) to the major stress (MJSS) is obtained. For example, the processor may generate an alpha stress value by dividing the minor strain by the major strain. The minor and major stress are stresses associated with a sheet metal, with each stress corresponding to a vector of stress in an X-Y direction. As shown, the alpha stress ratios are calculated by various alpha stresses that have been calculated and analyzed in operation 211. The calculation of the alpha stress may be performed by simulation using material properties and such as information about the dies used for the hemispheric tests, the sheet metal transformed, and the like (operations 212 and 213). The alpha stress value of the ith point is calculated.

The ith point represents various portions or predefined points on the FLC. Each portion or instance of the FLC is defined as a different point.

In branch 220, an operation of calculating the ith point transformation from the hemispherical dome test to the zero friction correction is performed. In operation 221, the friction upper fiber is employed to calculate the ith point. Other techniques may also be employed, such as adjusting the blank size 222, and drawing a depth and beta detection at the major and minor strains for the calculated ith point (223). Essentially, this operation is used to identify the step that the minor and major strain correlate with the hemisphere dome test at ith point. At the ith point, the Von Mises stress and Planar Effective stress are also derived (224). The processor may determine an alpha stress value based on the ration of the Von Mises stress to Planar Effective stress. The processor may determine alpha stress value rations by dividing the alpha stress value of the minor stress and the major stress by the alpha stress value of the Von Mises stress and the Planar Effective stress.

The alpha stress value ratio may change monotonically, but non-linearly. The processor may determine a range of alpha stress value ratios and may adjust the black size, as described herein, if the alpha stress value ratio is out of tolerance. The tolerance may be defined by a user or programmer of the instructions stored in the memory. Conversely, the processor does not adjust the blank size when the alpha stress value ratios are within tolerance.

In branch 230, the analysis in the zero friction case is performed. In operation 231, the zero friction for the middle fiber case (for the ith point) is employed for finding the corresponding values in a zero friction case. A value of beta may be generated that is used to determine the ratio of the minor to major strain that correlates the friction hemispherical dome simulation upper fiber Von Mises stress and the zero friction membrane Planar Effective stress. The Planar Effective Stress is the Von Mises stress without the thru thickness component.

In operation 232, the blank size for branch 230 is adjusted. For example, the processor may adjust the black size based on input from a user or based on preprogramed data until a stress ratio is within an acceptable tolerance (e.g., during simulation). The change in the blank size may be performed in a continuous, standard way. The similar operation may be performed for operation 222.

In operation 233, the drawing of depth and beta detection correlating Von Mises stress with Planar Effective stress depth is used to correlate the Planar Effective stress with the stress calculated in 223. If the two stresses are not within a tolerance of each other, the draw depth of the zero friction correction is adjusted.

In operation 250, the data calculated in operations 210-240 are employed to calculate a corresponding corrected FLD (forming limit diagram) at a major stress and minor stress of point i.

FIGS. 3-12 illustrate an example implementation of the system and methods described in FIG. 2. Referring to the FIGS. shown, a specific blank width is described (e.g., and examined) herein. However, one of ordinary skill in the art may apply a different blank width or size to perform the operations described herein.

For the following explanatory example, DP800 grade steel, 1.5 mm thick, with a hemispherical punch generated FLC material properties is used. The friction properties of the die process are illustrated. The friction case has a friction of 0.1 and failure at 21.1 mm. The blank width is 90.1 mm.

Figure 3:
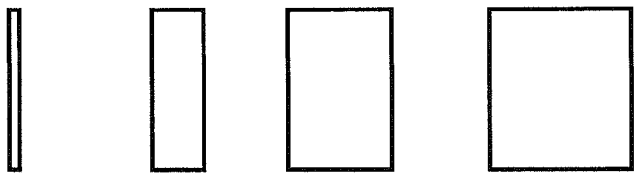
FIGS. 3-12 illustrate an example implementation of the system and methods described in FIG. 2.
Figure 3:
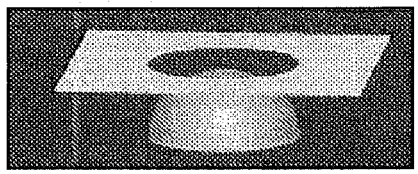
Figure 3:
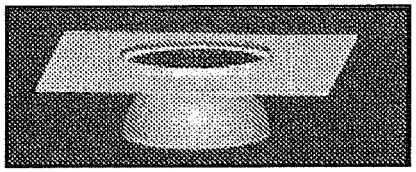
Figure 3:
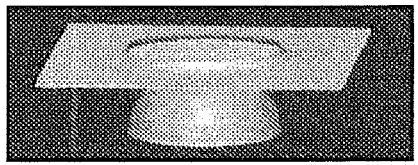
Figure 3:
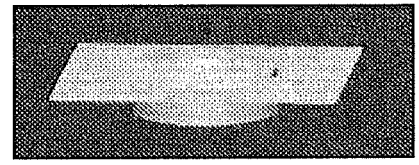
Figure 3:
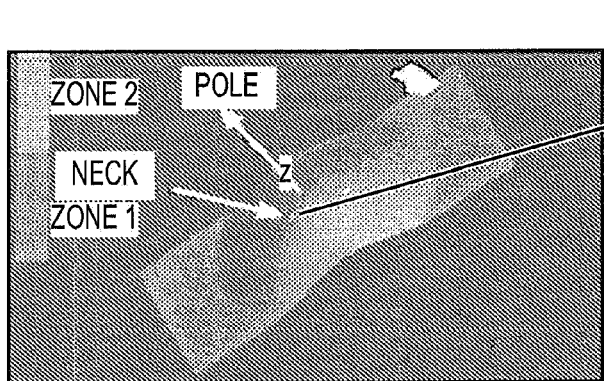
Figure 3:
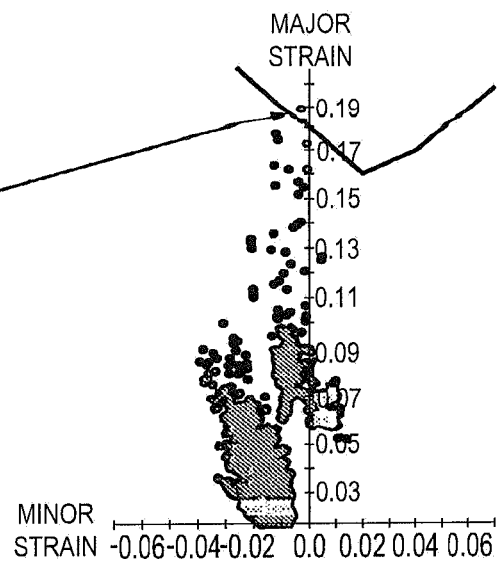

The friction amount determines the failure angle relative to the pole 160 at a specified minor to major strain ratio (e.g., the minor stress value is divided by the major stress value). As shown in FIG. 3, different blanks sizes, with a binder and punch, dies and drawing sheet are employed. Von Mises stress is determined by the FLC using the Levy-Mises Flow Hypothesis and is therefore, independent of friction.

Also shown in FIG. 3 is a hemispherical punch test at a minor strain equal to zero with a corresponding forming limiting diagram (FLD). The American Society for Testing and Materials (ASTM) uses standard die geometry and various blank sizes to provide a wide range of FLC values. The punch is stopped at necking failure to measure the strain values for the FLC.

The tension and Failure Angle to the Pole can be calculated both using a simplified tension approximation and in commercial formability software. The tension at the failure calculation is independent of friction and is illustrated below:

Krupkowski Hardening Curve with $\bar{\sigma}=K(\varepsilon_0+\bar{\varepsilon})^n$ where: K=1205.4, ε0=0.0011, n=0.116, t0=1.5 mm, T2=T/2

A maximum tension for the hemispherical punch test can be described as follows:

$$\varepsilon_1^* = n - \frac{\sqrt{3}}{2}\varepsilon_0 = 0.115$$

$$\text{Maximum Tension} = T1^* = \frac{2Kt_0}{\sqrt{3}}\left[\varepsilon_0 + \left(\frac{2}{\sqrt{3}}\right)\varepsilon^*\right]^n \exp(-\varepsilon^*) = 1473N$$

A thickness of the blank at the maximum tension may be described as:

$t^* = t_0 \exp(-\varepsilon_1^*) = 1.34$

The major stress for the hemispherical punch test may be described as:

σ1*=1473/t=1102 MPa with a corresponding flow stress of:

$$\bar{\sigma}^* = \frac{\sqrt{3}}{2}\sigma 1^* = 955 \text{ Mpa}$$

Figure 4:
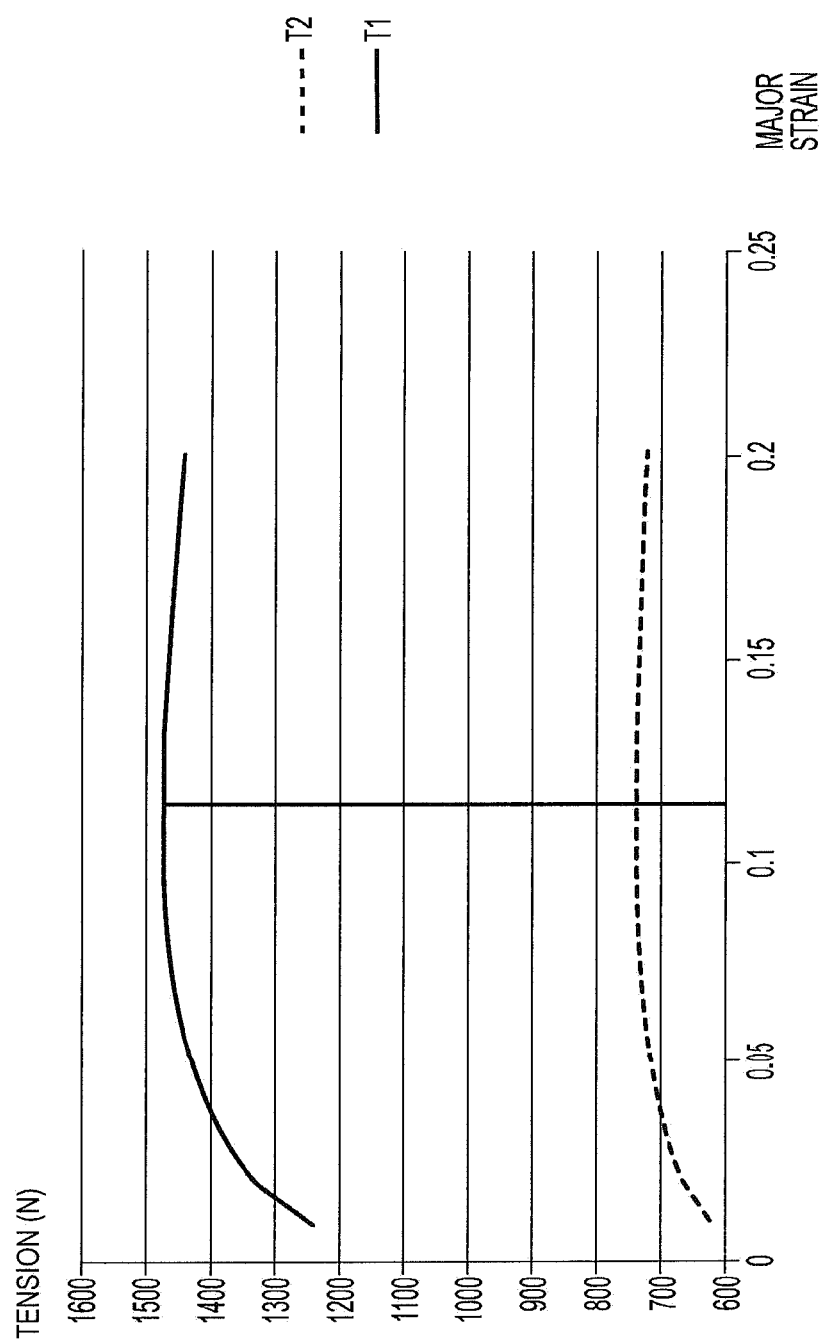

FIG. 4 is a graph showing the peak tension for T1 and T2.

The commercial formability software tension result at the neck is 1475 N, compared to the simplified calculation of 1473 N. A sheet sliding on surface equation is used to calculate the angle of wrap, which is the angle turned between points using different friction values. This identifies the failure angle relative to pole by the location of the failure meridian, j, from the pole (which may be represented by k).

T1k is the tension at the pole of 1435 N, taken from suitable commercial formability software formability software based on the polar element stress. T1j is the above calculation tension at failure, 1473 N.

The following list of expressions indicate an example methodology for calculating the angle between the pole and the neck:

$\theta_{jk}$=Angle of Wrap between points j and k

μ=coefficient of friction=0.1

$T_{1k}=T_{1j} \exp(\mu\theta_{jk})=1473$ N

θ=17°

Figure 5:
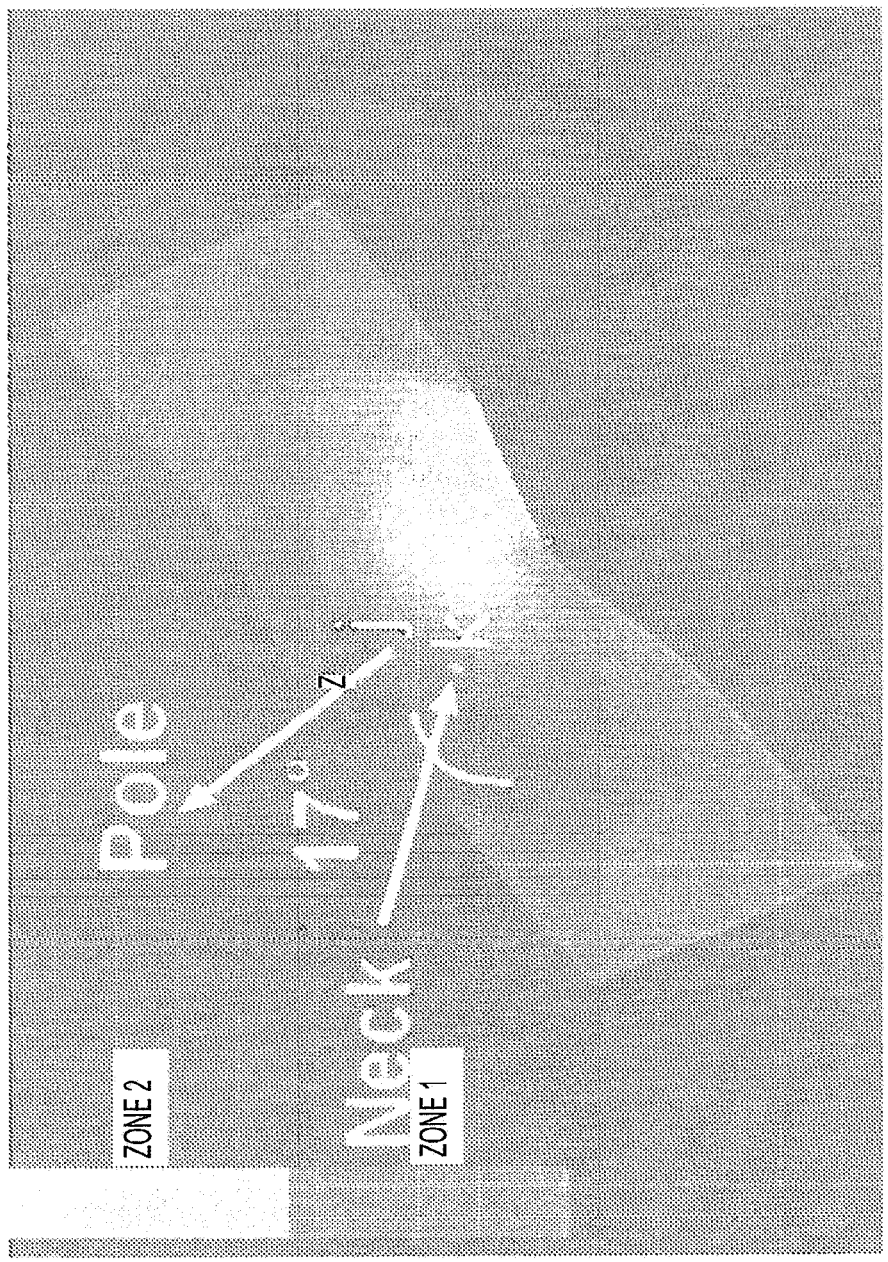

FIG. 5 illustrates an example of a simulation that predicts the angle of failure based on a commercial formability software simulation for the following values:
T1j Tension at Pole—1435 N
T1k Tension at Neck—1475 N
Angle between Pole & Neck~17°

The theoretical simplified tension approximation and angle of wrap are shown below. The commercial formability simulation software tension at the pole is used in the calculation.

The simplified calculation results may be described as:

T1jTension at Pole—1435 N From Pam-Stamp

T1k=1473 N—Simplified Calculation

Θjk=Angle of Wrap between j and k

T1k=T1j exp(μΘjk)

μ=Coefficient of Friction=0.1

The simplified angle of wrap result may be described as:
Failure Angle to Pole Angle~17°

Based on the above, the angle of wrap calculation implies that increasing the friction increases the failure angle relative to the pole. The contact pressure of the sliding sheet causes frictional shear stress, which increases the tension and strains because of the frictional force.

Figure 6:
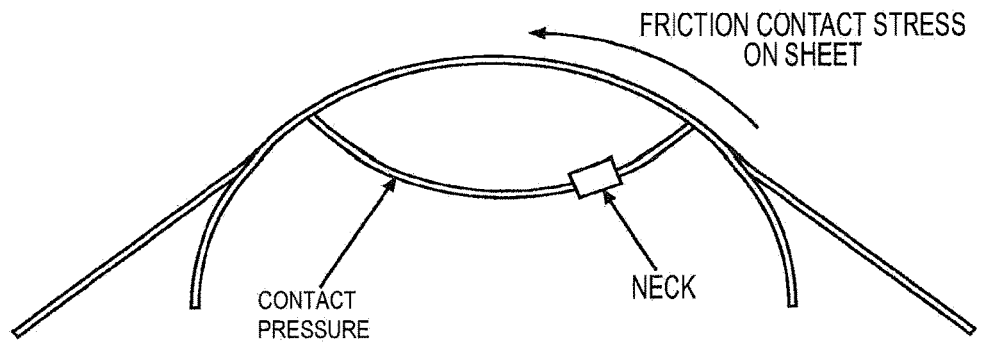

FIG. 6 illustrates the above described phenomena.

Figure 7:
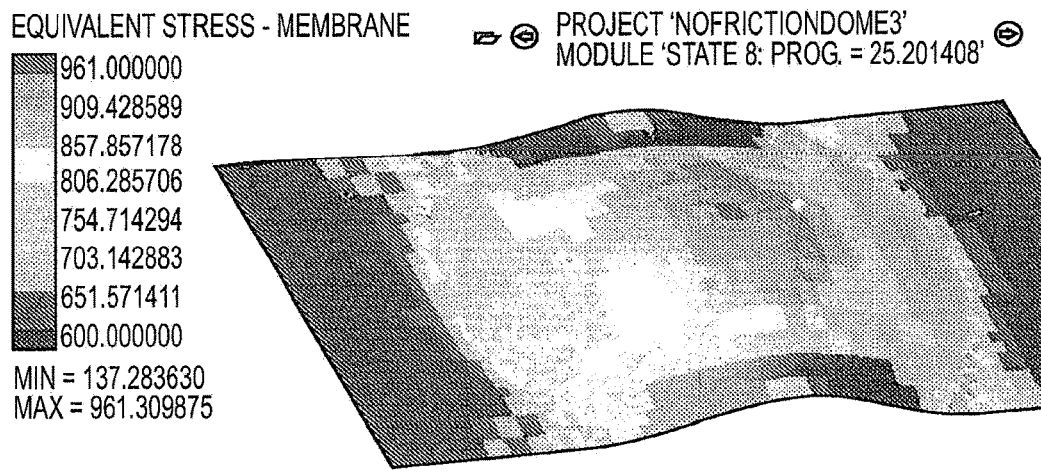

FIG. 7 shows a simulation of a zero friction test. The simplified angle of wrap calculations will be described below.

The simplified angle of wrap result may be described as:

T1k=T1j exp(μΘjk)

μ=0.0,T1k=T1j

The above shows that contact tension is distributed evenly.

The sheet fails at the pole as implied by the angle of wrap equation.
Commercial formability simulation software results:
σ=961 MPa Equivalent stress
T1~1770 N
Draw Depth=0.9 mm deep than with μ=0.1

Figure 8:
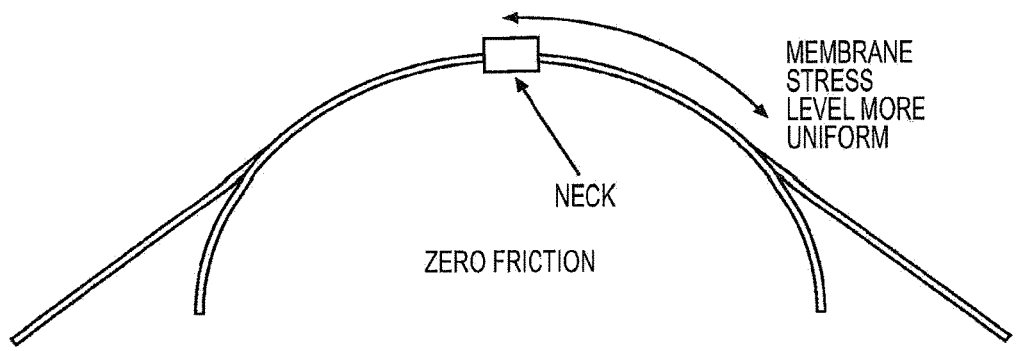

The Commercial Formability Software simulation shown in FIG. 7 confirms that the sheet fails at Pole, confirming the Angle of Wrap calculation. FIG. 8 illustrates a diagram of a zero friction test.

Stress and strain maximum occurs at or around the pole. The draw depth decreased compared to friction model because the stress concentrates more quickly at the pole. This correlates to a lower major strain. The DP800 draw depth is 0.09 mm shallower with zero friction.

The lower fiber stress result in the friction commercial formability software model is determined from the Hemispherical Punch FLD failure model. The friction model lower fiber stress is used to set the failure punch depth of the zero friction model. The depth is set so the zero friction model membrane stress is equal to the friction model lower fiber stress. The major and minor strain in the zero friction model is recorded as the Corrected FLC.

The process to correlate with the zero friction depth is as follows: Friction Coefficient=0.1; Peak tension occurs at an angle of 17 at 1470 N; The Lower Fiber stress=961 MPa for Failure; Failure Depth 21.2 mm; Major Strain of 0.20; Stress Ratio is approximately ½, indicating Plane Strain; Zero friction Coefficient=0.0; Peak tension occurs at the pole at 1770 N; Membrane Equivalent stress=961 MPa for Failure; Failure Depth 20.2 mm; Major Strain is 0.16

Commercial Formability Software Simulation of Shift Correction (C.F.S.S.S.C.)

According to an example of the aspects disclosed herein, different blank sizes may be employed to obtain failure at minor and major strain ratios. Employing the shift correction disclosed herein, a more accurate failure may be predicted.

Step 1: Simulation of the Hemispherical Punch Test

The transformation of the Hemispherical Punch Test into an accurate FLD for a DP800 sheet, 1.5 mm thick is illustrated. The first step is to determine the blank size for the commercial formability software friction simulation of Hemispherical Punch Test, so that the failure is detected at the lowest point of a test curve. The FLD is assumed accurate for lower fiber strain with an assumed friction of 0.1. The strain path is non-linear and the element may fail in a plane strain. The lower fiber strain is recorded for calibrating the zero friction model.

The blank is increased to 100 mm to match the biaxial strain ratio. The stress ratio is approximately ½ and the lower fiber stress indicating plane stress. The lower fiber stress, the layer furthest from the punch, is 961 MPa.

Step 2: Simulation of FLDØ

Figure 9:
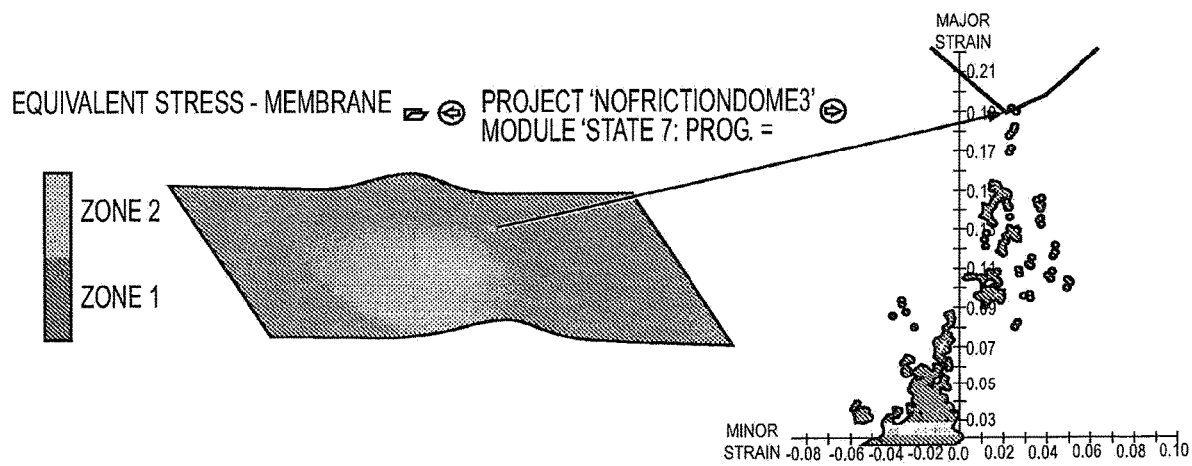

FIG. 8 illustrates an example of the zero friction test. FIG. 9 illustrates the commercial formability software simulation at the FLC low point using the model with friction.

The next step is to simulate the zero friction model with commercial formability software. The blank is adjusted to obtain plane strain for the simulation model of FLDØ. The depth is set so the membrane stress equals the recorded friction model lower fiber stress. The failure element is in the plane strain, and the major strain is recorded as the corrected FLDØ.

Figure 10:
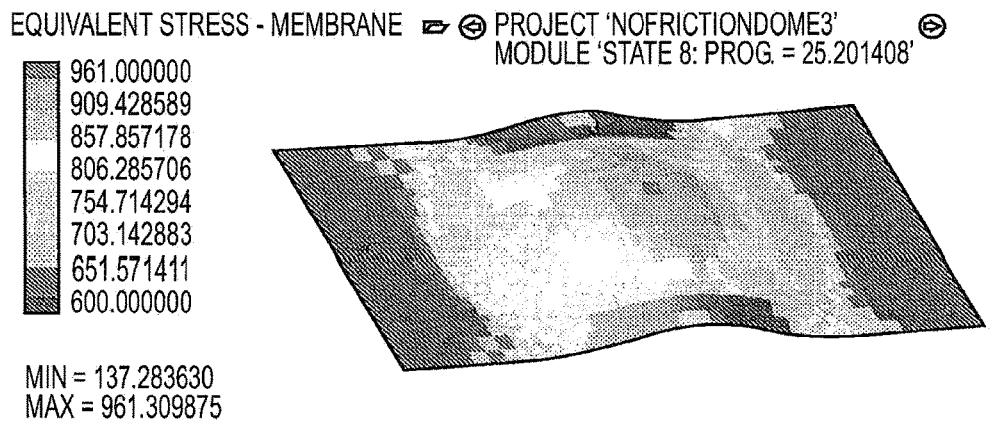

FIG. 10 illustrates the zero friction model with membrane equivalent stress equal friction model at failure element. The 90.1 mm blank and zero friction model, with a membrane equivalent stress equal to 961 MPa at failure punch depth is used. The major strain is 0.154 and the minor strain is 0.006.

Figure 11:
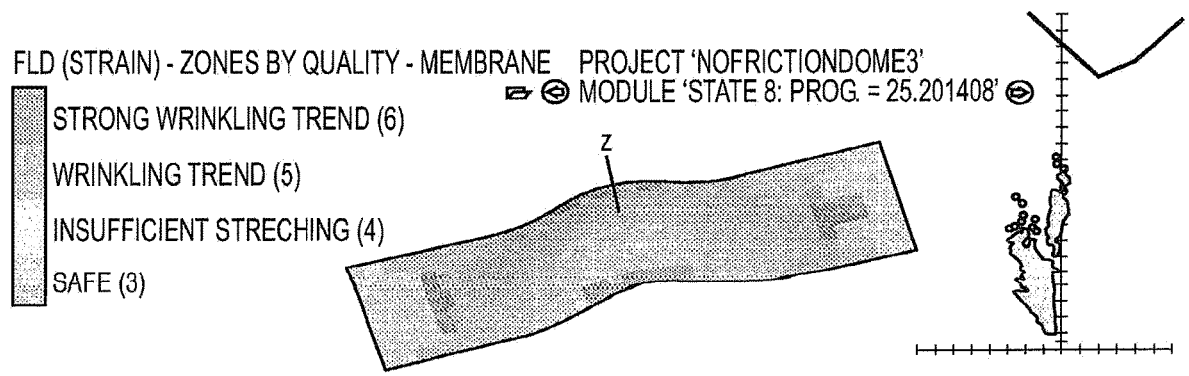

FIG. 11 illustrates a zero friction commercial formability software shown with a friction model FLC.

Step 3: FLDØ Based Translation

Figure 12:
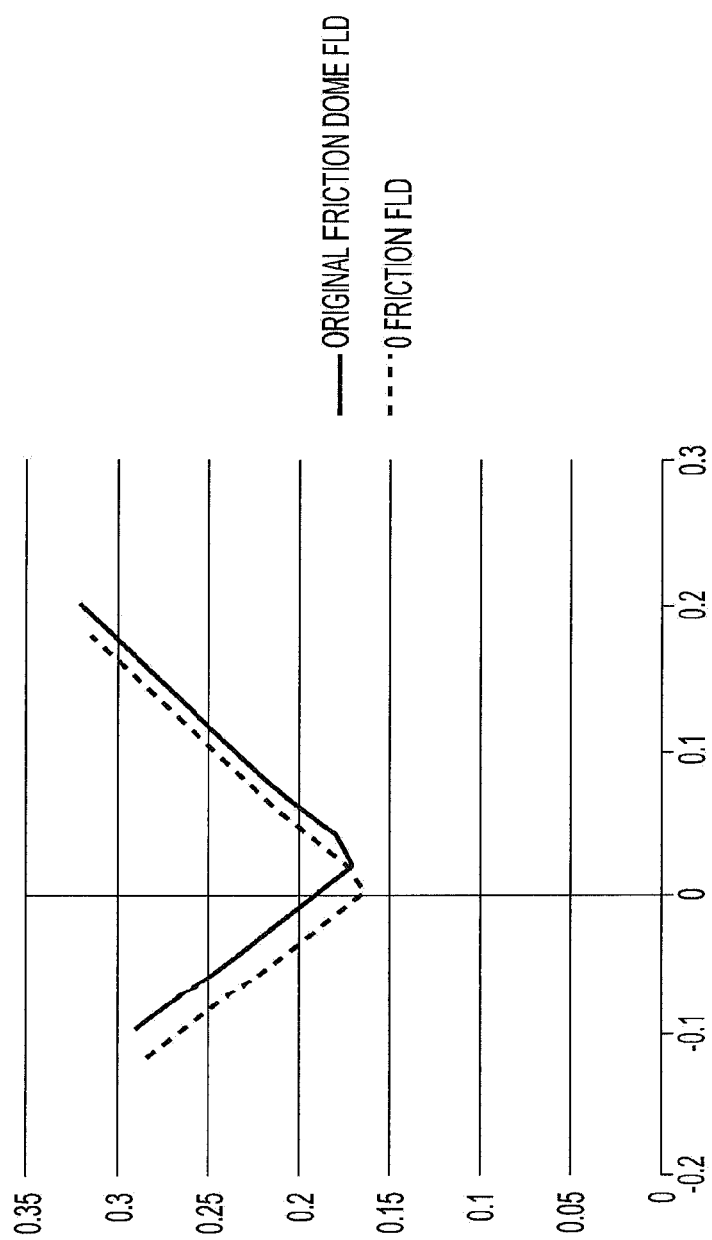

Based on the above steps, the FLD is adjusted based on the zero friction case. As shown in FIG. 12, the FLD curve is shifted, thereby providing a more accurate FLD to be employed in various sheet metal formation procedures.

The corrected FLD is significantly more accurate in predicting necking. The Hemispherical Punch Test FLD without correction predicts no failures.

Figure 13:
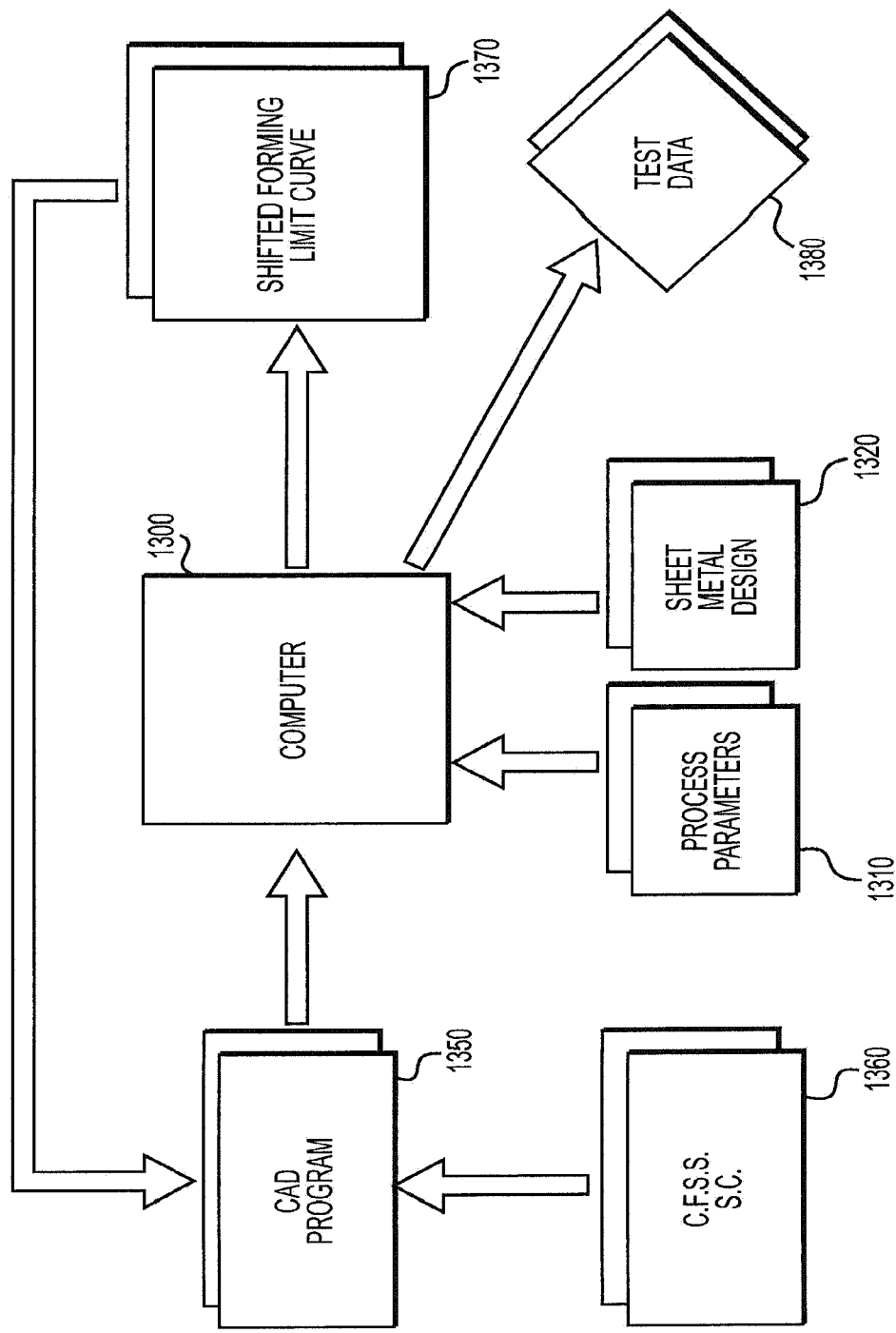
FIG. 13 illustrates an example of a system for implementing the systems and methods disclosed in FIG. 2 via a computer-aided engineering CAE) implementation.

FIG. 13 illustrates an example of a system for implementing the systems and methods disclosed in FIG. 2 via a computer-aided engineering (CAE) implementation. As shown in FIG. 13, a computer 1300 is provided with a CAE program 1350. The CAE program 1350 may be modified via the C.F.S.S.S.C. 1360. The C.F.S.S.S.C. 1360 may be an add-on installed or provided with a conventional CAE program 1350 to store, execute, and run various simulations associated with the testing of sheet metal.

The user, through an interface may input process parameters associated with the materials used 1310 and actual sheet metal design 1320. From that, the computer 1360 may generate a new shifted forming limit curve 1370. The new shifted forming limit curve 1370 may be used in conjunction with the CAE program 1350 to generate test data 1380 to indicate whether the sheet metal design 1320 passes the various hemispherical dome testing required to prove the integrity of the sheet metal design 1320, and produce test data 1380.

Certain of the devices shown in FIG. 13 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a flow chart and accompanying descriptions to illustrate the embodiments represented in FIG. 2. The disclosed devices, components, and systems contemplate using or implementing any suitable technique for performing the steps illustrated in these figures. Thus, FIG. 2 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

In some embodiments, a method for shifting a forming analysis based on zero friction analysis. The method includes calculating a first alpha stress value from a ratio of a minor stress and a major stress from a predefined property of a hemispheric dome test of a die, the die being employed to deform sheet metal used to perform the hemispheric dome test. The method also includes determining a forming limit diagram (FLD) based on the major stress and the minor stress. The method also includes generating a second alpha stress value of a zero friction analysis. The method also includes determining an alpha stress value ratio based on the first alpha stress value and the second alpha stress value. The method also includes generating a beta value of a zero friction analysis of a middle fiber. The method also includes generating a corrected a zero friction test using the alpha stress value ratio and the beta value. The method also includes determining an updated FLD based on the major stress, the minor stress, and the corrected zero friction test. The method also includes using the updated FLD to deform sheet metal using the die.

In some embodiments, the generating of the second alpha stress value further comprises: employing an friction upper fiber to calculate a point to analyze; adjusting a blank size for the point to determine whether a minor and major strain at the point is under a predetermined threshold; and deriving a Von Mises stress and a Planar Effective stress based on the adjusted blank size. In some embodiments, the derived Von Mises stress and the derived Planar Effective stress is combined with the beta value to produce the corrected zero friction test. In some embodiments, the generating of the beta value further comprises: adjusting a second blank size for the point based on a stress ratio being with a predetermined threshold; and generating a graphical representation of a depth based on the derived Von Mises stress and the derived Planar Effective stress for the creation of the beta value. In some embodiments, a value of the FLD is calculated at the point. In some embodiments, the FLD is used by an updated hemispheric dome test.

In some embodiments, a system for shifting a forming analysis based on zero friction analysis includes a data store comprising a computer readable medium storing a program of instructions for the shifting of a forming analysis and a processor that executes the program of instructions, the instructions comprising the following operations: calculating a first alpha stress value from a ratio of a minor stress and a major stress from a predefined property of a hemispheric dome test of a die, the die being employed to deform sheet metal used to perform the hemispheric dome test; determining a forming limit diagram (FLD) based on the major stress and the minor stress; generating a second alpha stress value of a zero friction analysis; determining an alpha stress value ratio based on the first alpha stress value and the second alpha stress value; generating a beta value of a zero friction analysis of a middle fiber; generating a corrected a zero friction test using the alpha stress value ratio and the beta value; determining an updated FLD based on the major stress, the minor stress, and the corrected zero friction test; and using the updated FLD to deform sheet metal using the die.

In some embodiments, the generating of the first alpha stress value further comprises: employing an friction upper fiber to calculate a point to analyze; adjusting a blank size for the point to determine whether a minor and major strain at the point is under a predetermined threshold; and deriving a Von Mises stress and a Planar Effective stress based on the adjusted blank size. In some embodiments, the derived Von Mises stress and the derived Planar Effective stress is combined with the beta value to produce the corrected zero friction test. In some embodiments, the generating of the beta value further comprises: adjusting a second blank size for the point based on a stress ratio being with a predetermined threshold; and generating a graphical representation a depth based on the derived Von Mises stress and the derived Planar Effective stress for the creation of the beta value. In some embodiments, a value of the FLD is calculated. In some embodiments, the FLD is used by an updated hemispheric dome test. In some embodiments, the system also includes a computer-aided engineering (CAE) configured to incorporate the updated hemispheric dome test.

In some embodiments, a system for shifting a forming analysis based on zero friction analysis includes a processor and a memory. The memory includes instructions that, when executed by the processor, cause the processor to: calculate a first alpha stress value from a ratio of a minor stress and a major stress from a predefined property of a hemispheric dome test of a die, the die being employed to deform sheet metal used to perform the hemispheric dome test; determine a forming limit diagram (FLD) based on the major stress and the minor stress; generate a second alpha stress value of a zero friction analysis; determine an alpha stress value ratio based on the first alpha stress value and the second alpha stress value; generate a beta value of a zero friction analysis of a middle fiber; generate a corrected a zero friction test using the alpha stress value ratio and the beta value; determine an updated FLD based on the major stress, the minor stress, and the corrected zero friction test; and use the updated FLD to deform sheet metal using the die.

In some embodiments, the instructions further cause the processor to: employ an friction upper fiber to calculate a point to analyze; adjust a blank size for the point to determine whether a minor and major strain at the point is under a predetermined threshold; and derive a Von Mises stress and a Planar Effective stress based on the adjusted blank size. In some embodiments, the derived Von Mises stress and the derived Planar Effective stress is combined with the beta value to produce the corrected zero friction test. In some embodiments, the instructions further cause the processor to: adjust a second blank size for the point based on a stress ratio being with a predetermined threshold; and generate a graphical representation a depth based on the derived Von Mises stress and the derived Planar Effective stress for the creation of the beta value. In some embodiments, a value of the FLD is calculated. In some embodiments, the FLD is used by an updated hemispheric dome test. In some embodiments, the system also includes a computer-aided engineering (CAE) configured to incorporate the updated hemispheric dome test.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

As used herein, the term processor can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

What is claimed is:

1. A method for shifting a forming analysis based on zero friction analysis, comprising:
   calculating a first alpha stress value from a ratio of a minor stress and a major stress from a predefined property of a hemispheric dome test of a die, the die being employed to deform sheet metal used to perform the hemispheric dome test;
   determining a forming limit diagram (FLD) based on the major stress and the minor stress;
   generating a second alpha stress value of a zero friction analysis of an upper fiber;
   determining an alpha stress value ratio based on the first alpha stress value and the second alpha stress value;
   generating a beta value of a zero friction analysis of a middle fiber;
   generating a corrected zero friction test using the alpha stress value ratio and the beta value;
   determining an updated FLD based on the major stress, the minor stress, and the corrected zero friction test; and
   using the updated FLD to deform sheet metal using the die.

2. The method according to claim 1, wherein the generating of the second alpha stress value further comprises:
   employing the upper fiber to calculate a point to analyze;
   adjusting a blank size for the point to determine whether a minor and major strain at the point is under a predetermined threshold; and
   deriving a Von Mises stress and a Planar Effective stress based on the adjusted blank size.

3. The method according to claim 2, wherein the derived Von Mises stress and the derived Planar Effective stress is combined with the beta value to produce the corrected zero friction test.

4. The method according to claim 3, wherein the generating of the beta value further comprises:
   adjusting a second blank size for the point based on a stress ratio being with a predetermined threshold; and
   generating a graphical representation of a depth based on the derived Von Mises stress and the derived Planar Effective stress for the creation of the beta value.

5. The method according to claim 4, wherein a value of the FLD is calculated at the point.

6. The method according to claim 5, wherein the FLD is used by an updated hemispheric dome test.

7. A system for shifting a forming analysis based on zero friction analysis, comprising:
   a data store comprising a computer readable medium storing a program of instructions for the shifting of a forming analysis;
   a processor that executes the program of instructions, the instructions comprising the following operations:
   calculating a first alpha stress value from a ratio of a minor stress and a major stress from a predefined property of a hemispheric dome test of a die, the die being employed to deform sheet metal used to perform the hemispheric dome test;
   determining a forming limit diagram (FLD) based on the major stress and the minor stress;
   generating a second alpha stress value of a zero friction analysis of an upper fiber;
   determining an alpha stress value ratio based on the first alpha stress value and the second alpha stress value;
   generating a beta value of a zero friction analysis of a middle fiber;
   generating a corrected zero friction test using the alpha stress value ratio and the beta value;
   determining an updated FLD based on the major stress, the minor stress, and the corrected zero friction test; and
   using the updated FLD to deform sheet metal using the die.

8. The system according to claim 7, wherein the generating of the first alpha stress value further comprises:
   employing the upper fiber to calculate a point to analyze;
   adjusting a blank size for the point to determine whether a minor and major strain at the point is under a predetermined threshold; and
   deriving a Von Mises stress and a Planar Effective stress based on the adjusted blank size.

9. The system according to claim 8, wherein the derived Von Mises stress and the derived Planar Effective stress is combined with the beta value to produce the corrected zero friction test.

10. The system according to claim 9, wherein the generating of the beta value further comprises:
    adjusting a second blank size for the point based on a stress ratio being with a predetermined threshold; and
    generating a graphical representation a depth based on the derived Von Mises stress and the derived Planar Effective stress for the creation of the beta value.

11. The system according to claim 9, wherein a value of the FLD is calculated.

12. The system according to claim 11, wherein the FLD is used by an updated hemispheric dome test.

13. The system according to claim 12, further comprising a computer-aided engineering (CAE) configured to incorporate the updated hemispheric dome test.

14. A system for shifting a forming analysis based on zero friction analysis, comprising:
    a processor; and
    a memory that includes instructions that, when executed by the processor, cause the processor to:
    calculate a first alpha stress value from a ratio of a minor stress and a major stress from a predefined property of a hemispheric dome test of a die, the die being employed to deform sheet metal used to perform the hemispheric dome test;
    determine a forming limit diagram (FLD) based on the major stress and the minor stress;
    generate a second alpha stress value of a zero friction analysis of an upper fiber;
    determine an alpha stress value ratio based on the first alpha stress value and the second alpha stress value;
    generate a beta value of a zero friction analysis of a middle fiber;
    generate a corrected zero friction test using the alpha stress value ratio and the beta value;
    determine an updated FLD based on the major stress, the minor stress, and the corrected zero friction test; and
    use the updated FLD to deform sheet metal using the die.

15. The system of claim 14, wherein the instructions further cause the processor to:
    employ the upper fiber to calculate a point to analyze;

adjust a blank size for the point to determine whether a minor and major strain at the point is under a predetermined threshold; and derive a Von Mises stress and a Planar Effective stress based on the adjusted blank size.

16. The system of claim 15, wherein the derived Von Mises stress and the derived Planar Effective stress is combined with the beta value to produce the corrected zero friction test.

17. The system of claim 16, wherein the instructions further cause the processor to:

adjust a second blank size for the point based on a stress ratio being with a predetermined threshold; and generate a graphical representation a depth based on the derived Von Mises stress and the derived Planar Effective stress for the creation of the beta value.

18. The system of claim 16, wherein a value of the FLD is calculated.

19. The system of claim 18, wherein the FLD is used by an updated hemispheric dome test.

20. The system of claim 19, further comprising a computer-aided engineering (CAE) configured to incorporate the updated hemispheric dome test.

* * * * *